Figure 1:
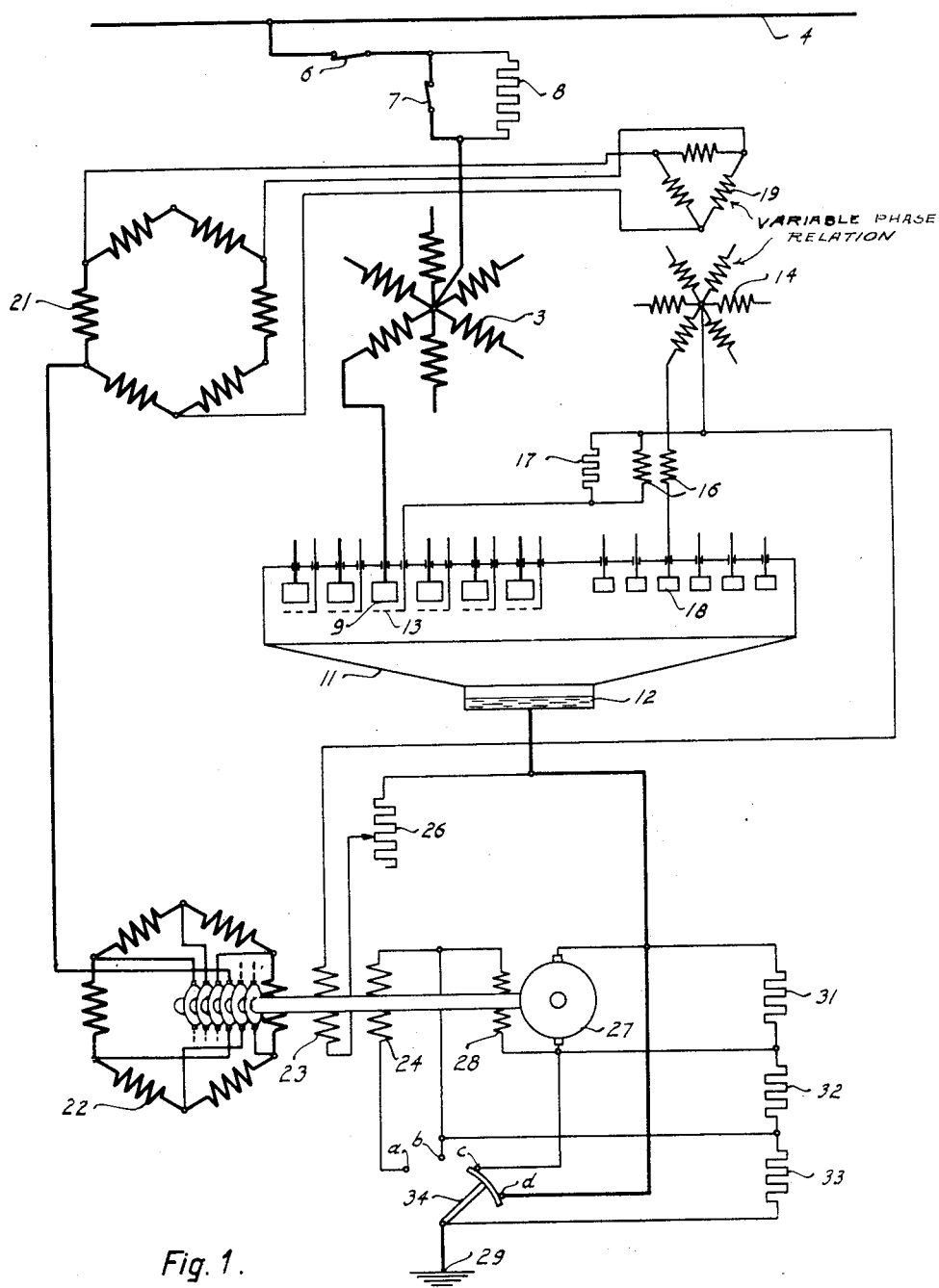

Sept. 19, 1933.   E. KERN   1,927,406
HIGH VOLTAGE DIRECT CURRENT CONVERTING SYSTEM
Filed March 25, 1931   2 Sheets-Sheet 1

Inventor
Erwin Kern
By (signature)
Attorney

Patented Sept. 19, 1933

1,927,406

UNITED STATES PATENT OFFICE 1,927,406

HIGH-VOLTAGE DIRECT-CURRENT CONVERTING SYSTEM

Erwin Kern, Wettingen, Switzerland, assignor to Aktiengesellschaft Brown Boveri & Cie., Baden, Switzerland, a joint-stock company of Switzerland Application March 25, 1931, Serial No. 525,211, and in Germany March 7, 1930

8 Claims. (Cl. 171—228)

This invention relates to improvements in systems for converting high-voltage direct-current into mechanical energy by the aid of a motor without a commutator which motor is controlled by electric valves.

The continued increase of power transmission over long distances by means of high-voltage alternating-current with its attendant disadvantages of power factor correction, reactive voltage drop and limit of stability continually tends to encourage the transmission of direct current at high-voltages. The practical availability of such high-voltage direct-current transmission of power, however, depends on whether or not the high-voltage direct-current can be converted, at the point of use of the power, into a type of current which is practically useful. Such problem is, at least theoretically, solved at the present time. In some cases, however, the problem of directly connecting motors to such transmission lines without the interposition of a low-voltage secondary network is also present. Direct-current motors without commutators and controlled by electric valves are known. In such motors, the different supply points of the operating winding are connected with direct-current sources through electric valves and may be supplied at a relatively high direct voltage. The upper limit of voltage permissible for such machines is accordingly limited only by the insulation of the several portions thereof. Such permissible voltages are, however, much too low to serve as transmission voltages and are, therefore, not available for the remote transmission of power.

It is, likewise, well-known that the voltages induced in the several sections of the armature winding of a direct-current motor are substantially sine waves. In such motors, the usual commutator can be replaced by a plurality of electric valves, in which case it is convenient to reduce the number of armature sections to a small number, the armature then becoming similar in its connections to the armature of an alternating current machine of the synchronous type.

In such valve controlled motors, the grids of the valves control the corresponding anodes and cause attachment of the arc thereon only when the induced voltage or back E. M. F. in the corresponding armature section are substantially equal to the direct voltage impressed thereon. The impressed voltage is thus split into a polyphase system of alternating current voltages applied to the armature through the valves so that it is possible, instead of connecting the valves directly to the armature, to connect the valves and the armature with the interposition of a polyphase transformer. The impressed voltage is then balanced in sequence by the voltages appearing at the terminals of the high voltage winding of the transformer, which voltages are obtained by transformation of the voltages induced in the sections of the motor armature. Such valve controlled motor may accordingly be supplied, by means of a transformer, from a high-voltage direct-current system, the voltage of which may be different from and usually is higher than the voltage supplied directly to the motor. The current in the direct-current line thus does not flow through the motor but only flows through the transformer primary winding and through the valve or valves.

It is well-known that a valve controlled direct-current motor directly connected to a direct-current line can be started from standstill and brought up to its normal speed in the same manner as a motor provided with a commutator. If the motor, however, is connected to the line through a transformer, while at standstill, the direct-current flowing in the transformer primary winding will not induce any current in the transformer secondary winding and the motor will not be able to start. Other means must, therefore, be employed for starting and rotating the motor up to at least a fraction of its normal speed which may comprise a separate starting motor of the usual commutator type. The main motor then operating as a generator may be connected to the line when the voltage induced in its armature by the relative motion of the armature and of the exciter field, and transformed in the transformer, is raised to such value as to counteract on the impressed voltage to such an extent as to prevent the flow of an excessive current. Such current may be limited by the use of a starting resistance, if found necessary.

It is, therefore, among the objects of the present invention to provide a system for the conversion of high-voltage direct-currents into mechanical energy by the use of motors controlled by electric valves.

Another object of the invention is to provide a system for the conversion of high-voltage direct-currents into mechanical energy by the use of motors without mechanical commutating structures.

Another object of the invention is to provide a motor for the conversion of high-voltage direct-currents into mechanical energy by the use of motors without mechanical commutators and which are controlled by electric valves in such manner that the voltages received by the operating windings of the motor are supplied directly thereto by means of a transformer.

Figure 2:
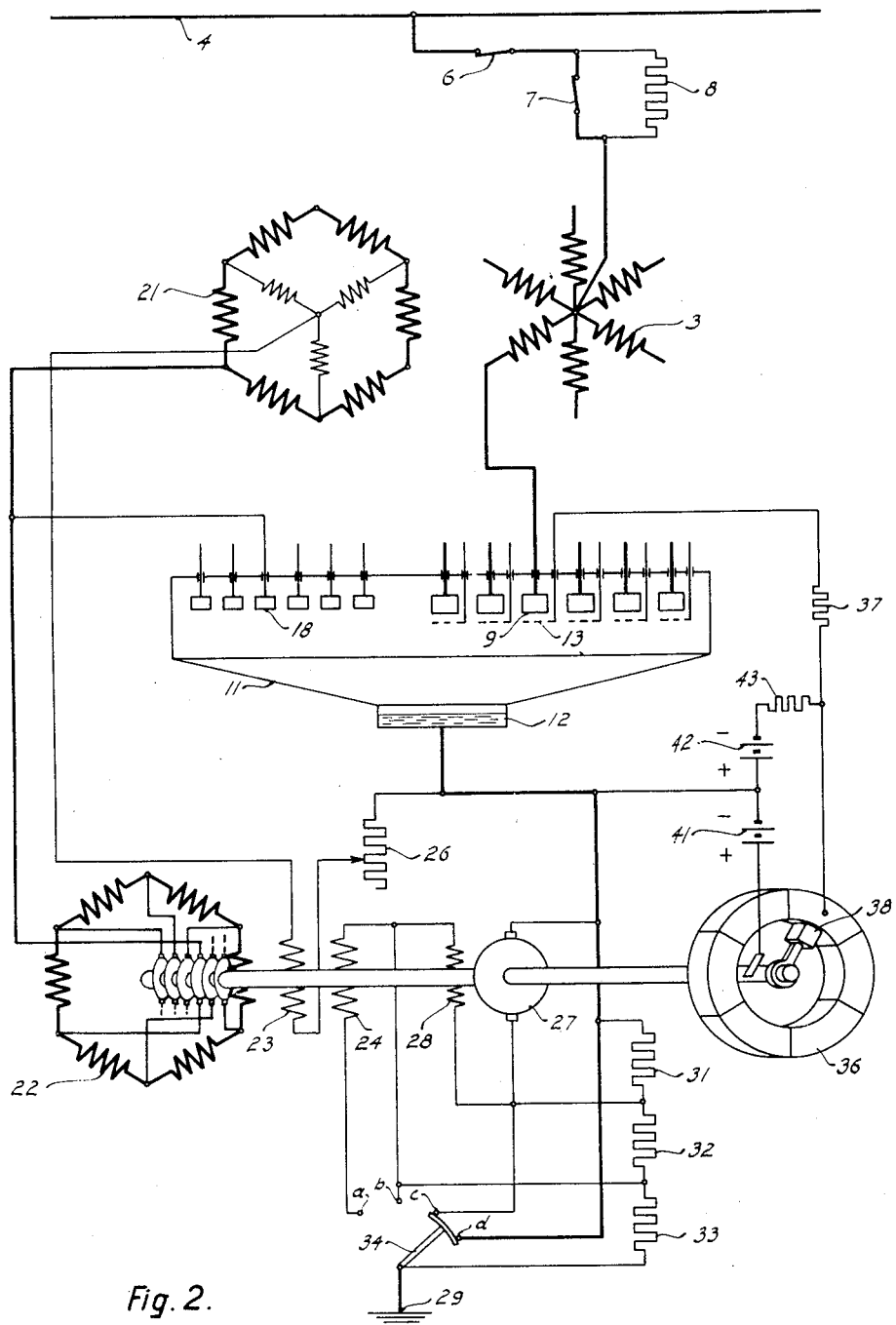

Objects and advantages, other than those above set forth, will be apparent from the following description when read in connection with the accompanying drawings, in which Figure 1 is a diagrammatic showing of one embodiment of the present invention illustrating one means whereby voltage impulses are supplied to the grids of an electric valve, for the control thereof, from current transformers inserted in the circuit of a rectifying system supplying the field of the motor and comprising an auxiliary transformer arranged in displaced phase relation with a main transformer, and Fig. 2 is a view similar to that shown in Fig. 1 in which the potential supplied to the grids of the electric valves is obtained from an auxiliary potential source and is controlled by means of a mechanical commutating structure connected mechanically with and rotatable by the motor.

The system shown may be divided generally into an inverter structure for changing the high-voltage direct-current into alternating-current, a main motor which is here shown as of the synchronous type, and means for starting the main motor such as the usual direct-current commutator motor mechanically connected with the main motor.

The inverting portion of the system is shown as a transformer having a primary winding 3 comprising a plurality of winding sections arranged in star with the neutral point thereof connected with a high-voltage transmission line 4 through switches 6 and 7. Switch 7 is arranged to short-circuit a resistance 8, the purpose of which will appear hereinafter. Each of the several winding sections of the transformer primary winding 3 are connected with a main anode 9 of an electric valve. The structure assumes that the high-voltage source has its positive terminal connected through line 4 and its negative terminal connected to ground. A single electric valve with a plurality of anodes and a single cathode 12 is used as the equivalent of a more complicated structure comprising a plurality of single anode valves. Each of the main anodes 9, here shown as six in number for a six-phase system, is provided with a grid as at 13 for the purpose of controlling the moment of attachment of the arc on the accompanying main anode. The grids 13 are each supplied with a potential of the proper value and phase position from a current transformer 16 having a resistance 17 connected in parallel therewith. The auxiliary transformer secondary winding 14 supplies direct-current to motor field 23 through a group of anodes 18 of the valve, and is designed so as to permit adjustment of the phase relation between its primary and secondary terminal voltages to permit variation of the timing of the impulses transmitted to grids 13 through transformers 16. Such adjustment, however, does not influence its operation as a converter for supplying field winding 23. The primary winding 19 of the auxiliary transformer is connected with and supplied from the secondary winding 21 of the main transformer. The amount of current drawn from the line by the motor is varied by varying the phase shifting action of transformer 14, 19 and thereby vary the timing of the impulses transmitted to grids 13, thereby regulating the output or the speed of the motor.

The main motor above mentioned comprises an armature winding 22 connected at intermediate points thereof with similar points on the secondary winding 21 of the main transformer, and two field windings 23 and 24. Field 23 is connected through a variable resistance 26 with the cathode 12 of the valve and with the secondary winding 14 of the auxiliary transformer.

The motor starting system includes a motor having an armature 27 and a field winding 28 connected respectively between the cathode 12 and ground as at 29 and in parallel with resistances 31, 32 and 33 with the cathode circuits. The starting motor and field 24 of the main motor are controlled by a switch 34 having contacts a, b, c and d.

When the main motor is to be started, switch 6 is closed, switch 7 is opened to connect resistance 8 in circuit for the purpose of limiting the current therein, and switch 34 is rotated to contact with point a. Current then flows from line 4 through windings 3, through one or more of the anodes 9 of rectifier 11, through the starting motor 27, 28 and through field 24 of the main motor, thereby causing rotation of armature 27. The armature 22 of the main motor, being mechanically coupled with the starting motor, is rotated and, due to the excitation of field 24, operates as a generator until the main motor is up to speed and field 23 is excited. Switch 34 is then rotated to the position shown, thereby opening the circuit of fields 24 and 28 and short-circuiting armature 27 of the starting motor. Switch 7 is then closed to short-circuit resistance 8 and the system is in its running condition as is shown in the drawings.

During operation of the main motor 22, 23 and 24, as a generator, the armature 22 supplies a voltage to the respective phase windings of secondary winding 21 of the main transformer and primary 19 of the auxiliary transformer. The respective phase sections of the transformer winding 3 and anodes 9 of the rectifier are therefore supplied with an alternating voltage which establishes and continues the arcs for the flow of current from the anodes to the cathode, and which controls sequentially the action of the grids supplied from the phase shifting auxiliary transformer 14, 19 through current transformers 16. The auxiliary transformer also supplies current to the auxiliary anodes 18 which operate to supply current for the excitation of field winding 23. It is to be understood that switches 7 and 34 are not operated, as above described, until field 23 is excited.

During operation of the main motor as a motor, anodes 9 and 18 are supplied with current from line 4, their voltages, however, being determined by the induced voltages in armature winding 22 on the windings 21 and 19 and, by induction, on windings 3 and 14. The grids 13 receive positive impulses required through the current transformers 16 as soon as the auxiliary anodes operate and field 23 is excited so that the main anodes 9 may be permitted to function to pass current therefrom to the cathode. The main motor may be regulated either by variation of the phase relation of the auxiliary transformer 14, 19 with the main transformer, or by adjustment of resistance 26. The auxiliary transformer must, however, be so adjusted that the arcs attach to the main anodes 9 at moments when the counter-electromotive forces induced in the respective phase sections of winding 3 from the motor armature winding 22, by way of winding 21, are a predetermined degree less than the voltage of the anode then operating, or just finishing its operation.

The embodiment shown in Fig. 2 differs from that previously shown and described in the replacement of the grid controlling and auxiliary anode supplying auxiliary transformer by a commutator structure operated by the starting and main motors for the purpose of supplying the voltage impulses to the grids in the proper sequence. The grid controlling commutating structure comprises a segmental commutator 36 connected through resistances 37 with the grids 13. A brush 38 contacting with the segments of commutator 36 is connected with the positive pole of an auxiliary direct-current source 41 and 42 through a resistance 43 with the conductor of the grids. The intermediate point of the direct-current auxiliary sources 41 and 42 is connected with the cathode 12 of the rectifier.

The segment of the commutator in contact with the brush at any given moment may take a positive potential which is applied to the grid 13 connected therewith, and the current may, therefore, flow through the adjacent anode 9 until the counter-electromotive force impressed on the corresponding sections of the transformer winding 3 by the armature winding 22 is such as to reduce the potential at the anode to a value insufficient to maintain the arc, and is thereafter blocked by the grid which is thereupon charged with negative potential from the battery 42 through resistances 43 and 37. The continuing rotation of brush 36 sequentially impresses a positive potential upon the respective grids through segments 36 and resistances 37 from battery 41, permitting thereby arcs to be established with the associated anodes 9 and thus maintain continuously the flow of current from source 4 sequentially through the corresponding phase sections of the transformer winding 3 and the supply, by induction, through secondary winding 21, of alternating current for operating the motor, as explained with respect to the embodiment according to Fig. 1 of the drawings. In the embodiment of the invention according to Fig. 2 of the drawings, the field winding 23 is also energized through anodes 18 directly from the secondary winding 21 of the main transformer, instead of from an auxiliary transformer as in the arrangement of Fig. 1 of the drawings. It will be understood that the connections to only one point throughout the system have been shown and that similar connections will be made to all other points of the system.

Although but two embodiments of the present invention have been illustrated and described, it will be apparent to those skilled in the art that various changes and modifications may be made therein without departing from the spirit of the invention or from the scope of the appended claims.

The invention claimed is:

1. The combination with a direct current supply circuit, of an alternating current consumption circuit, a transformer having a primary winding divided into a plurality of phase sections having a star-point connection and a secondary winding interlinking said circuits, a vapor type electric valve comprising a plurality of anodes connected respectively with said phase sections, a cathode, and a plurality of control electrodes associated respectively with said anodes, the said direct current circuit being connected with the said primary winding and with said valve at the said star-point connection and said cathode respectively, means operable to periodically impress upon said control electrodes potentials of such signs as to sequentially permit and prevent initiation of flow of current in said direct current circuit by way of said winding sections and said anodes, and a motor connected with said alternating current circuit and operable by current supplied thereto from said secondary winding, the operation of said motor being effective to periodically and sequentially cause counter-electromotive forces to be induced in said primary winding sections of such magnitude as to cause sequentially the interruption of flow of direct current in said primary winding sections.

2. The combination with a direct current supply circuit, of an alternating current consumption circuit, a transformer having a primary winding divided into a plurality of phase sections having a star-point connection and a secondary winding interlinking said circuits, a vapor type electric valve comprising a plurality of anodes connected respectively with said phase sections, a cathode, and a plurality of control electrodes associated respectively with said anodes, the said direct current circuit being connected with the said primary winding and with said valve at the said star-point connection and said cathode respectively, means operable to periodically impress upon said control electrodes potentials of such signs as to sequentially permit and prevent initiation of flow of current in said direct current circuit by way of said winding sections and said anodes, and a motor connected with said alternating current circuit and operable by current supply thereto from said secondary winding, the operation of said motor being effective to periodically and sequentially cause counter-electromotive forces to be induced in the said primary winding sections by way of said secondary winding of such magnitude as to cause sequentially the interruption of flow of said direct current in said primary winding sections by way of said anodes and cathode.

3. The combination with a direct current supply circuit, of an alternating current consumption circuit, a transformer having a primary winding divided into a plurality of phase sections having a star-point connection and a secondary winding interlinking said circuits, a vapor type electric valve comprising a plurality of anodes connected respectively with said phase sections, a cathode, and a plurality of control electrodes associated respectively with said anodes, the said direct current circuit being connected with said primary winding and with said valve at the said star-point connection and said cathode respectively, an auxiliary transformer having a winding connected with and energized from said secondary winding and a winding divided into a plurality of phase sections operable to periodically impress upon said control electrodes potentials of such signs as to sequentially permit and prevent initiation of flow of current in said direct current circuit by way of said anodes, and a motor connected with said alternating current circuit and operable responsive to current supply thereto from said secondary winding, the operation of said motor being effective to periodically and sequentially cause counter-electromotive forces to be induced in said primary winding sections of such magnitude as to cause sequentially the interruption of flow of direct current in the respective said primary winding sections.

4. The combination with a direct current supply circuit, of an alternating current consumption circuit, a transformer having a primary winding divided into a plurality of star-connected phase sections and a secondary winding interlinking said circuits, of a vapor type electric valve comprising a plurality of anodes connected respectively with said phase sections, a cathode, and a plurality of control electrodes associated respectively with said anodes, the said direct current circuit being connected with said primary winding and with said valve at the said star-connection thereof and at said cathode respectively, a phase-shifting transformer connected with the said secondary winding operable to periodically cause potentials to be impressed upon said control electrodes of such signs and at such moments as to sequentially permit and prevent initiation of flow of current in said direct current circuit by way of said anodes and said winding sections, and a motor connected with said alternating current circuit operable responsive to current supplied therefrom by way of said secondary winding, the operation of said motor being effective to periodically and sequentially cause counter-electromotive forces to be induced in said primary winding sections by way of said secondary winding of such magnitudes and at such moments with respect to the potentials impressed upon said control electrodes as to cause sequentially the interruption of flow of direct current in said primary winding sections as to effect the conversion of said direct current into an alternating current having a frequency determined by the said potentials impressed upon the control electrode and the said counter-electromotive forces induced in said primary winding sections.

5. The combination with a direct current supply circuit, of an alternating current consumption circuit, a transformer having a primary winding divided into a plurality of star-connected phase sections and a secondary winding interlinking said circuits, a vapor type electric valve comprising a plurality of anodes connected respectively with said phase sections, a cathode, and a plurality of control electrodes associated respectively with said anodes, the said direct current circuit being connected with said primary winding and with said valve at the said star-connection and said cathode respectively, an auxiliary source of current connected with and operable to continuously impress on each of said control electrodes potential negative with respect to the potential of said cathode for preventing flow of current in said direct current circuit by way of said anodes, a second auxiliary source of current, a switching means operable to periodically connect said second auxiliary source of current sequentially with said control electrodes to thereby impress upon said control electrodes potential of such sign and magnitude as to render said electrodes positive with respect to the potential of said cathode to thereby permit initiation of flow of current in said direct current circuit by way of said anodes, and a motor connected with said alternating current circuit and operable by current supplied therefrom by way of said secondary winding, the operation of said motor being effective to periodically and sequentially cause counter-electromotive forces to be induced in said direct current circuit by way of said transformer windings of such magnitude as to cause sequentially the interruption of flow of current in said primary winding sections by way of said anodes, and the said switching means being operated by said motor in such manner as to cause the impression of said potentials upon the said control electrodes at such moments with relation to the said potentials induced in said primary winding as to determine and control thereby the frequency of the current of said alternating current circuit.

6. The combination with a direct current supply circuit, of an alternating current consumption circuit, a main transformer having a primary winding divided into a plurality of star-connected phase sections and a secondary winding divided into a plurality of phase sections, the said transformer interlinking said circuits, a vapor type electric valve comprising a plurality of main anodes connected with said star-connected phase sections, a plurality of auxiliary anodes, a cathode, and a plurality of control electrodes associated respectively with said main anodes, the said direct current circuit being connected with said primary winding and said valve at said star-connection and said cathode respectively, an auxiliary transformer having a winding connected with said secondary winding and a secondary winding divided into a plurality of phase sections connected respectively with said auxiliary anodes to periodically cause potentials to be impressed upon said control electrodes of such sign as to sequentially permit and prevent initiation of flow of current in said direct current circuit by way of said main anodes, and a motor having an armature divided into a plurality of sections connected respectively with the said secondary winding phase sections of said main transformer to be supplied with operating current therefrom, and a field winding connected with said auxiliary transformer secondary winding to be supplied with excitation current therefrom by way of said auxiliary anodes, the said armature winding being effective responsive to operation of said motor to cause counterelectromotive forces to be induced in the respective said star-connected transformer winding sections of such magnitude as to cause sequentially the interruption of flow of current in said direct current circuit by way of said main anodes.

7. The combination with a direct current supply circuit, of an alternating current consumption circuit, a transformer interlinking said circuits comprising a primary winding divided into a plurality of phase sections having a star point connection and a secondary winding divided into a plurality of polygonal connected phase sections, a vapor type electric valve comprising a plurality of anodes connected respectively with said phase sections of said primary winding, a cathode, and a plurality of control electrodes associated respectively with said anodes, the said direct current circuit being connected with said primary winding and with said valve at said star point connection and said cathode respectively, means operable to continuously impress on each of said control electrodes potential of such sign as to be negative with respect to the potential of said cathode for preventing initiation of flow of current in said direct current circuit by way of said anodes and cathode, means operable to periodically and sequentially impress upon said electrodes potential of such sign and magnitude as to render said electrodes positive with respect to said cathode to thereby periodically and sequentially permit initiation of flow of current in said direct current circuit by way of said primary winding sections and said anodes, and means connected with said alternating current circuit operable to periodically and sequentially impress counter-electromotive forces of said primary winding sections by way of said secondary winding of such magnitude as to cause sequentially interruption of flow of direct current by way of said anodes.

8. The combination with a direct current supply circuit, of an alternating current consumption circuit, a main transformer interlinking said circuits comprising a primary winding divided into a plurality of phase sections having a star point connection and a secondary winding, a vapor type electric valve having a cathode, a plurality of main anodes connected respectively with said phase sections, a plurality of auxiliary anodes, and a plurality of control electrodes associated respectively with said main anodes, the said direct current circuit being connected with said primary winding and with said valve at said star point connection and said cathode respectively, an auxiliary transformer comprising a primary winding connected with and energized from the said secondary winding of said main transformer, and a secondary winding divded into a plurality of start connected phase sections connected respectively with said auxiliary anodes operable to periodically and sequentially cause flow of current of unidirection by way of said auxiliary anode and cathode, the circuit for flow of said unidirection current including connections with said control electrode for continuously impressing thereon potential negative with respect to the potential of said cathode, means included in the connections between said phase sections of said auxiliary transformer and said auxiliary anodes operable to periodically and sequentially impress upon said control electrodes potential of such sign and magnitude as to render said electrodes positive with respect to the potential of said cathode to thereby periodically and sequentially permit initiation of flow of current in said direct current circuit by way of said main anodes and cathode, and means connected with said alternating current circuit operable to periodically and sequentially impress counter-electromotive forces on said primary windings by way of the secondary winding of said main transformer of such magnitude as to cause sequentially interruption of flow of current by way of said main and auxiliary anodes.

ERWIN KERN.